US012267443B2

(12) United States Patent
Davies et al.

(10) Patent No.: US 12,267,443 B2
(45) Date of Patent: Apr. 1, 2025

(54) METHODS AND DEVICES FOR SECURE SYMBIOTIC MINING

(71) Applicant: nChain Licensing AG, Zug (CH)

(72) Inventors: Jack Davies, London (GB); Wei Zhang, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 278 days.

(21) Appl. No.: 17/766,713

(22) PCT Filed: Oct. 8, 2020

(86) PCT No.: PCT/IB2020/059462
§ 371 (c)(1),
(2) Date: Apr. 5, 2022

(87) PCT Pub. No.: WO2021/070106
PCT Pub. Date: Apr. 15, 2021

(65) Prior Publication Data
US 2023/0344658 A1    Oct. 26, 2023

(30) Foreign Application Priority Data
Oct. 9, 2019   (GB) .................................. 1914572

(51) Int. Cl.
*H04L 9/00*   (2022.01)
*H04L 9/32*   (2006.01)
(52) U.S. Cl.
CPC .............. *H04L 9/50* (2022.05); *H04L 9/3236* (2013.01)

(58) Field of Classification Search
CPC ....... H04L 9/50; H04L 9/3236; H04L 9/3239; H04L 9/0643; H04L 67/104;
(Continued)

(56) References Cited

U.S. PATENT DOCUMENTS

2016/0330031 A1   11/2016   Drego et al.
2017/0249606 A1    8/2017   Pirooz
(Continued)

FOREIGN PATENT DOCUMENTS

WO   2018215949 A1   11/2018
WO   2018229633      12/2018
WO   2019021107       1/2019

OTHER PUBLICATIONS

Lee, Suhyeon, and Seungjoo Kim. "Pooled mining makes selfish mining tricky." Cryptology ePrint Archive (2018). (Year: 2018).*
(Continued)

*Primary Examiner* — Sangseok Park
(74) *Attorney, Agent, or Firm* — Messner Reeves LLP (57) ABSTRACT

Methods and devices to enable the splitting of storage and validation functions from mining function in a blockchain network. The storage and validation nodes create candidate blocks and collect block rewards from successfully mined blocks. The mining nodes provide hash power for mining the candidate blocks and received resources from the storage and validation node for successful mining of a candidate block. Atomic exchange mechanisms are described for preventing loss and fraud and minimizing the use of bandwidth by mining nodes.

19 Claims, 6 Drawing Sheets

(58) Field of Classification Search
CPC ............ H04L 67/1093; H04L 67/1095; G06Q 20/065; G06Q 20/223; G06Q 20/389; G06Q 20/401; G06F 21/64
See application file for complete search history.

(56) References Cited

U.S. PATENT DOCUMENTS

| | | |
|---|---|---|
| 2018/0109541 A1 | 4/2018 | Gleichauf |
| 2019/0079950 A1* | 3/2019 | Ramabaja ............. H04L 9/0637 |
| 2019/0268142 A1 | 8/2019 | Lecker et al. |
| 2019/0296915 A1 | 9/2019 | Lancashire |
| 2019/0303363 A1 | 10/2019 | Leung et al. |
| 2020/0012731 A1* | 1/2020 | Deshpande ........... H04L 9/0643 |
| 2020/0076575 A1* | 3/2020 | Irazabal ................ H04L 9/3247 |
| 2021/0067321 A1* | 3/2021 | Lu ....................... G06F 16/9027 |

OTHER PUBLICATIONS

GB1914572.1 Combined Search and Examination Report dated Apr. 14, 2020.
PCT/IB2020/059462 International Search Report and Written Opinion dated Dec. 7, 2020.
Suhyeon Lee et al, Pooled Mining Makes Selfish Mining Tricky, IACR, International Association for Cryptologic Research, vol. 20181230:125843 Dec. 22, 2018 (Dec. 22, 2018), pp. 1-16, Retrieved from the Internet: URL:http://eprint.iacr.org/2018/1230.pdf.
Antonopoulos, A.M., "Bitcoin and blockchain, Technology supporting cryptocurrencies", Jul. 21, 2016, NTT Publishing Co., Ltd., 75 Pages.

* cited by examiner

METHODS AND DEVICES FOR SECURE SYMBIOTIC MINING

CROSS REFERENCE TO RELATED APPLICATIONS

This application is the U.S. National Stage of International Application No. PCT/IB2020/059462 filed on Oct. 8, 2020, which claims the benefit of United Kingdom Patent Application No. 1914572.1, filed on Oct. 9, 2019, the contents of which are incorporated herein by reference in their entireties.

TECHNICAL FIELD

The present disclosure relates to blockchain networks and, in particular, to mining in a blockchain network.

BACKGROUND

Mining nodes (or "miners") are key elements of a blockchain network. In "proof-of-work" blockchain networks, the mining nodes compete to complete a proof-of-work in order to "win" the race to mine a block and thereby collect the transaction fees and any newly-minted tokens reflected in a coinbase transaction within the new block. In this manner, the miners secure the network, ensuring that transactions are valid and that all participating nodes conform to the prevailing blockchain protocol. Nodes validate the transactions and blocks containing the transactions against prescribed criteria for validity before propagating the transactions and blocks throughout the blockchain network.

As the network scales and proof-of-work searches become more computationally difficult, the mining function demands significant computing power (sometimes termed "hashpower"). The quantity of transactions and the size of the transactions also means heavy computing, storage, and bandwidth demands for the validation and propagation functions. It would be advantageous to find mechanisms for better structuring a blockchain network and blockchain nodes and/or the operations carried out by those nodes, so as to meet these demands, while still ensuring security of the transactions without the need for trusted intermediaries.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLES

In one aspect, there may be provided a computer-implemented method of mining in a blockchain network, the blockchain network including a non-mining node and a plurality of mining nodes. The method may include generating, by the non-mining node, a candidate block containing a plurality of transactions including a source transaction that includes a first output associated with the non-mining node and a miner transaction that includes the first output of the source transaction as an input and includes a second output associated with a first mining node; determining a payload summary of the candidate block; sending, to the first mining node, the payload summary, the miner transaction, and a first summary path for the miner transaction; receiving, from the first mining node, a proof-of-work solution for the candidate block; and propagating the candidate block on the blockchain network In some implementations, sending may exclude sending the source transaction to the first mining node. In some cases, sending includes sending a candidate block header for the candidate block, the candidate block header containing the payload summary.

In some implementations, the source transaction and the mining transaction are not propagated on the blockchain network and are not contained in a mempool prior to receipt of the proof-of-work solution for the candidate block.

In some implementations, sending may include sending, to the first mining node, a hash of the source transaction and a second summary path for the source transaction.

The method may further include, at the first mining node, validating that the miner transaction is included in the candidate block based on the payload summary and the first summary path. In such a case, in some instances the sending includes sending, to the first mining node, a hash of the source transaction and a second summary path for the source transaction, and validating includes validating that the source transaction is included in the candidate block based on the payload and the second summary path.

In some implementations, the payload summary includes a Merkle root, the first summary path includes a first Merkle path, and the first Merkle path includes a minimum set of hashes for reconstructing the Merkle root from the miner transaction.

In some implementations, generating may include generating, by the non-mining node, a second candidate block containing a second plurality of transactions including the source transaction and a second miner transaction that includes the first output of the source transaction as an input and includes a further output associated with a second mining node different from the first mining node.

In a further aspect, the present application describes a computer-implemented method of mining in a blockchain network, the blockchain network including a non-mining node and a mining node. The method may include receiving, at the mining node from the non-mining node, a candidate block header for a candidate block, a payload summary for the candidate block, a miner transaction, and a first summary path for the miner transaction; validating that the miner transaction is included in the candidate block based on the payload summary and the first summary path; repeatedly mining the candidate block header with successive nonce values inserted in the candidate block header until a proof-of-work is found; and sending, to the non-mining node, at least the nonce value corresponding to the proof-of-work.

In yet a further aspect, the present application provides a method of mining in a blockchain network, the blockchain network including a non-mining node and a plurality of mining nodes. The method may include generating, by the non-mining node, a candidate block containing a plurality of transactions; sending at least a candidate block header for the candidate block to the plurality of mining nodes; receiving, from a first mining node from the plurality of mining nodes, a hash of a proof-of-work solution, the proof-of-work solution including the candidate block containing a nonce; hashing the hash of the proof-of-work solution to produce a proof-of-work result and determining that the proof-of-work result satisfies a difficulty setting; in response to the proof-of-work result satisfying the difficulty setting, generating a miner transaction having an output associated with the first mining node and locked by the proof-of-work solution; and receiving from the first mining node the proof-of-work solution; and completing and propagating the candidate block on the blockchain network.

In an additional aspect, the present application describes a computer-implemented method of mining in a blockchain network, the blockchain network including a non-mining node and a mining node. The method may include receiving, by the mining node from the non-mining node, a candidate block header for a candidate block containing a plurality of transactions; repeatedly mining the candidate block header with successive nonce values inserted in the candidate block header until a proof-of-work is found; sending, to the non-mining node, a hash of the proof-of-work; and receiving, from the non-mining node, a miner transaction having an output associated with the mining node and locked by the proof-of-work solution; and propagating the miner transaction on the blockchain network.

In another aspect, there may be provided a computing device implementing a node in a blockchain network. The computing device may include memory, one or more processors, and computer-executable instructions that, when executed, cause the processors to carry out one or more of the methods described herein.

In yet another aspect, there may be provided a computer-readable medium storing processor-executable instructions for operating a node in a network, the processor-executable instructions including instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application will refer to hashing or a hash function, which is intended to include any one of a number of cryptographic hash functions that, when applied to an arbitrary set of data or "message", deterministically produce a unique fixed-length alphanumeric string. The result of a hash function may be called a hash value, fingerprint, hash result, or equivalent. Example hash functions include, but are not limited to, SHA-2, SHA-3, and BLAKE2.

In this document the term 'blockchain' is understood to include all forms of electronic, computer-based, distributed ledgers. These include consensus-based blockchain and transaction-chain technologies, permissioned and un-permissioned ledgers, shared ledgers and variations thereof.

While example blockchain protocols may be discussed below for illustrative purposes, the present application is not limited to use with any particular blockchain or blockchain protocol, and alternative blockchain implementations and protocols fall within the scope of the present application.

A blockchain is a peer-to-peer, electronic ledger which is implemented using a computer-based decentralised, distributed system. The blockchain is made up of blocks which in turn are made up of transactions. Each transaction is a data structure that encodes, among other possible information, the transfer of control of a digital resource in the blockchain system and includes at least one input and at least one output. Transactions may contain small programs known as scripts embedded into their inputs and outputs, which specify how and under what conditions the outputs of the transactions can be accessed. On some platforms, these scripts are written using a stack-based scripting language. Access to the digital resource and the ability to further distribute some or all of the digital resource is governed by the unlocking conditions on the output. An example condition typically includes a digital signature using a private key corresponding to a public key used to lock the output, although many other conditions may be imposed.

Each block header contains a summary of the block's contents, such as in the form of a Merkle root, and each block header contains a hash of the previous block header so that blocks become chained together to create a permanent, unalterable record of all transactions which have been written to the blockchain since its inception.

The blockchain is implemented over a network of nodes. Each node is a computing device with network connectivity and executing software that carries out the applicable blockchain protocol. Nodes validate transactions and propagate them to other nodes in the network. Specialized network nodes, termed "mining nodes" or "miners", collect a set of unconfirmed transactions, i.e. pending transactions, into a block and attempt to "mine" the block. Mining, in these examples, refers to solving a proof-of-work (POW) before any other miner in the network succeeds in solving a proof-of-work for their respective block. In some examples, a POW involves hashing a block header containing a nonce until the result of the hashing is below a threshold value that is set by a difficulty parameter. The nonce is repeatedly incremented and the hashing repeated until the result is below the threshold value or until the miner receives notice that another miner has succeeded. Variations in mining process will be familiar to those ordinarily skilled in the art.

As noted above, mining nodes are key to securing the blockchain network. Mining nodes are compensated for their work when they win the race to find a valid new block. The compensation comes through transaction fees from individual transactions and from a "coinbase" transaction that is included in the new block. A coinbase transaction has no inputs (or, more properly, an empty or null input field) and it outputs a prescribed quantity of tokens (e.g. coins) to the miner, effectively creating new tokens. A coinbase transaction may also be referred to as a "generation transaction", and those terms may be used interchangeably herein. The coinbase or generation transaction has certain characteristics that distinguish it from regular transactions. For example, each valid block contains only one generation transaction. Each generation transaction takes no input (or the input field, if any, does not affect the transaction) and generates an output of tokens of a quantity set by the then-prevailing block reward due to a successful miner according to the governing blockchain protocol. The generation transaction is a "proof-of-work transaction", as it can only be created by a mining node that successfully mines a block, i.e. completes a proof of work.

In at least one example blockchain, the hashing of the block header to find a POW is a double-hash, which may be expressed herein using the notation $H^2(\cdot)$. In some such examples, the hash function used is SHA-256. Other blockchain networks may use other hashes.

In the early days of blockchain development, a "full node" was commonly thought to be an ideal as it would perform all the functions of mining, validation, blockchain storage, and propagation. As blockchain networks mature, there are different computing demands that arise in mining, storage, validation and propagation. Mining requires vast quantities of computing power for hashing, storage requires a large quantity of disk space storage, validation requires significant high speed computational throughput and fast-access memory, and propagation requires high bandwidth connections with as many other nodes in the blockchain network as possible so as to try to realize a small-world network model. It may be advantageous to separate some of these functions to enable efficiencies though specialized node construction and operation. However, any separation of functions should avoid introducing trust issues as between nodes that would necessitate third party oversight or a trusted intermediary between nodes so as to maintain the decentralized nature of the blockchain network.

In one aspect, the present application describes blockchain systems and methods in which the mining functions are carried out by mining nodes and some other functions, such as for example storage and validation functions, are carried out by non-mining nodes. In some cases, the non-mining node may perform validation and propagation functions. In some cases, the non-mining node may perform validation and storage functions. In some cases, the non-mining node may perform all functions of a full node other than mining. In such systems and methods, the non-mining nodes store or have access to the pool of pending transactions and the blockchain and construct one or more candidate blocks for mining by the mining nodes. The mining nodes carry out the hashing operations to find a proof-of-work for a candidate block that is provided to the mining nodes by one of the non-mining nodes. The non-mining nodes and the mining nodes are not necessarily owned or controlled by the same entity. In such processes, the non-mining node may obtain the block reward upon successful mining of a block and the non-mining node may transfer resources to the mining node for its part in successful mining of a block.

To maintain security over the mining protocol and prevent malicious or fraudulent operations, the mining process may be reconfigured to be collectively performed by multiple entities, such as a dedicated mining node and a separate storage and validation node (i.e. a non-mining node). The reconfiguration of operations in the mining process as between the separate nodes may be structured to ensure an atomic exchange between the non-mining nodes and the mining nodes. An atomic exchange is one in which a first node and a second node each have data or resources needed by the other node and a mutual exchange occurs upon occurrence of an event and not otherwise. An exchange is considered atomic if the only possible outcomes are that both events occur (the mutual exchange of data or resources) or neither event occurs. A significant technical challenge lies in how to configure the nodes, their interaction, and the communications process to ensure that an atomic exchange occurs. In some examples below, the double-hash operation within the proof-of-work operation may be exploited to provide a knowledge proof and may be relied upon as a prerequisite condition to setting up the atomic exchange. In some cases, the candidate block may be constructed by the non-mining node so as to contain at least one transaction that establishes the atomic exchange, and which the mining node may verify in advance of mining.

The terms "non-mining node" and "storage and validation node" may be used interchangeably in the present description.

In one example implementation, the non-mining node provides a candidate block to a number of mining nodes. Upon receiving a message establishing verifiable proof of success from one of the mining nodes, but not the actual solution to the POW, the non-mining node may generate and provide to the successful mining node a mining transaction transferring control of resources to the successful mining node on condition of disclosure of the solution. Notably, the mining transaction is only generated by the non-mining node in response to determining that the mining node has provided a validated knowledge proof evidencing that a POW solution has been determined by the mining node.

One of the challenges faced by blockchain networks is the need for fast propagation of transaction and blocks through the network. This mandates large bandwidth connections between nodes. In some cases, bandwidth may be restricted, leading to propagation delays and consequent bottlenecks in the network. For example, the Chinese government imposes certain bandwidth restrictions as part of the firewall it uses to control network traffic into and out of China. There are a number of mining rigs in China constructed to provide large hashpower to solve POW challenges. The delay in propagating transactions and blocks to the Chinese miners and the delay in a successful miner in China propagating a complete block with a solved POW to the outside world makes the use of Chinese-based mining rigs less than optimal. In some cases it may increase the probability of orphaning a block and/or causing a temporary fork. It would be advantageous to provide for methods and system of mining blockchain transactions that mitigate the problems that arise from mining nodes having low bandwidth connections.

The methods and systems described herein may be used to minimize the data transmitted to and received from a mining node by offloading much of the bandwidth consumption to a non-mining node.

Some of the below-described systems and methods enable splitting of storage and mining functions and provide for a mining marketplace in which miners may compete to solve POW for blocks prepared by a non-mining node. It may be unnecessary to provide the mining nodes with the full candidate block and the non-mining node may be relied upon to propagate the completed block. In some cases, the non-mining node may provide the mining nodes with the partial candidate block header, e.g. with the Merkle root and other fields but without the nonce and timestamp. The mining node may then insert the nonce and timestamp and hash the candidate block header in search of a POW solution.

Separated Mining and Validation with Minimized Bandwidth Usage

Figure 1:
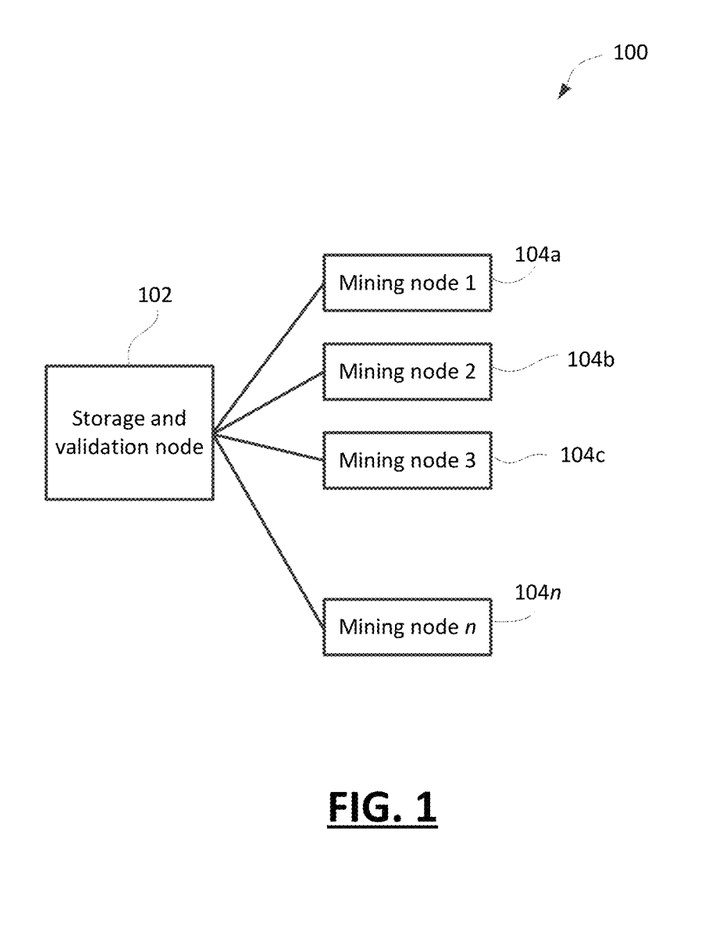
FIG. 1 illustrates a simplified example of a partial blockchain network with split mining and storage/validation nodes.

Reference is now made to FIG. 1, which diagrammatically shows an example of a partial blockchain network 100. The partial blockchain network includes a storage and validation node 102 (i.e. a non-mining node) and a plurality of mining nodes 104 (labelled individually as 104a, 104b, 104c, and 104n). The storage and validation node 102 builds a candidate block. This includes determining the Merkle root and partially completing the candidate block header. The nonce and timestamp fields may be empty in the candidate block header. The storage and validation node 102 provides each mining node 104 with at least the header of the candidate block and the mining nodes 104 proceed to search for a POW by inserting nonces and timestamps and hashing the candidate block header. The storage and validation node 102 may also provide the TxIDs for the transactions included in the block along with the candidate block header, in some implementations. In some example implementations, the storage and validation node 102 may perform the role of a mining pool manager, and may specify portions of the nonce search space to each mining node 104. In some example implementations, the storage and validation node 102 does not specify any portion of the nonce search space and the mining nodes 104 may compete against each other in searching for a solution. In some example implementations, one or more of the mining nodes 104 is a mining pool.

In the event that one of the mining nodes 104 finds a POW solution, i.e. a nonce and timestamp that result in a double-hashed block header that is less than the difficulty setting, then that mining node 104 sends a message to the storage and validation node 102. In particular, that mining node 104 sends the storage and validation node 102 a single hash of the block header. The storage and validation node 102 may then hash the single hash to prove that the result satisfies the difficulty setting, thereby verifying that the mining node 104 has found a POW solution. The storage and validation node 102 may then create an atomic exchange event with the mining node 104 by generating a transaction to transfer control over a resource to the mining node 104, but with an output locked by a condition that necessitates revelation of the POW solution.

The successful mining node 104 verifies that the transaction appears valid and, if so, then it provides the POW solution to the storage and validation node 102 which then validates and broadcasts the block.

The storage and validation node 102 has received a single hash of the POW solution, i.e. $H(\phi)$. It may therefore establish a locking condition on the output of the miner transaction that requires the candidate block header $\phi$, with nonce and timestamp, that when double-hashed will match a double-hash of the POW solution, $H^2(\phi)$. To access the output of the miner transaction, the mining node 104 must reveal the block header $\phi$ that was the basis for the knowledge proof $H(\phi)$ that it sent to the storage and validation node 102 as its claim to have solved the POW.

It will be appreciated that the mining node 104 may withhold revelation of its POW solution until after another miner has mined a block, and it may nevertheless access the output of the miner transaction by then revealing the POW solution that is now of no value. However, the storage and validation node 102 has provided the same candidate block to a plurality of miners, each of which is searching for a solution. In the event that a second mining node 104 provides another solution, the storage and validation node 102 then creates a second miner transaction for that second mining node 104 spending the same UTXO. The first of the mining nodes 104 to reveal its solution will have control over the UTXO, and the other miner transaction will be invalid.

Figure 2:
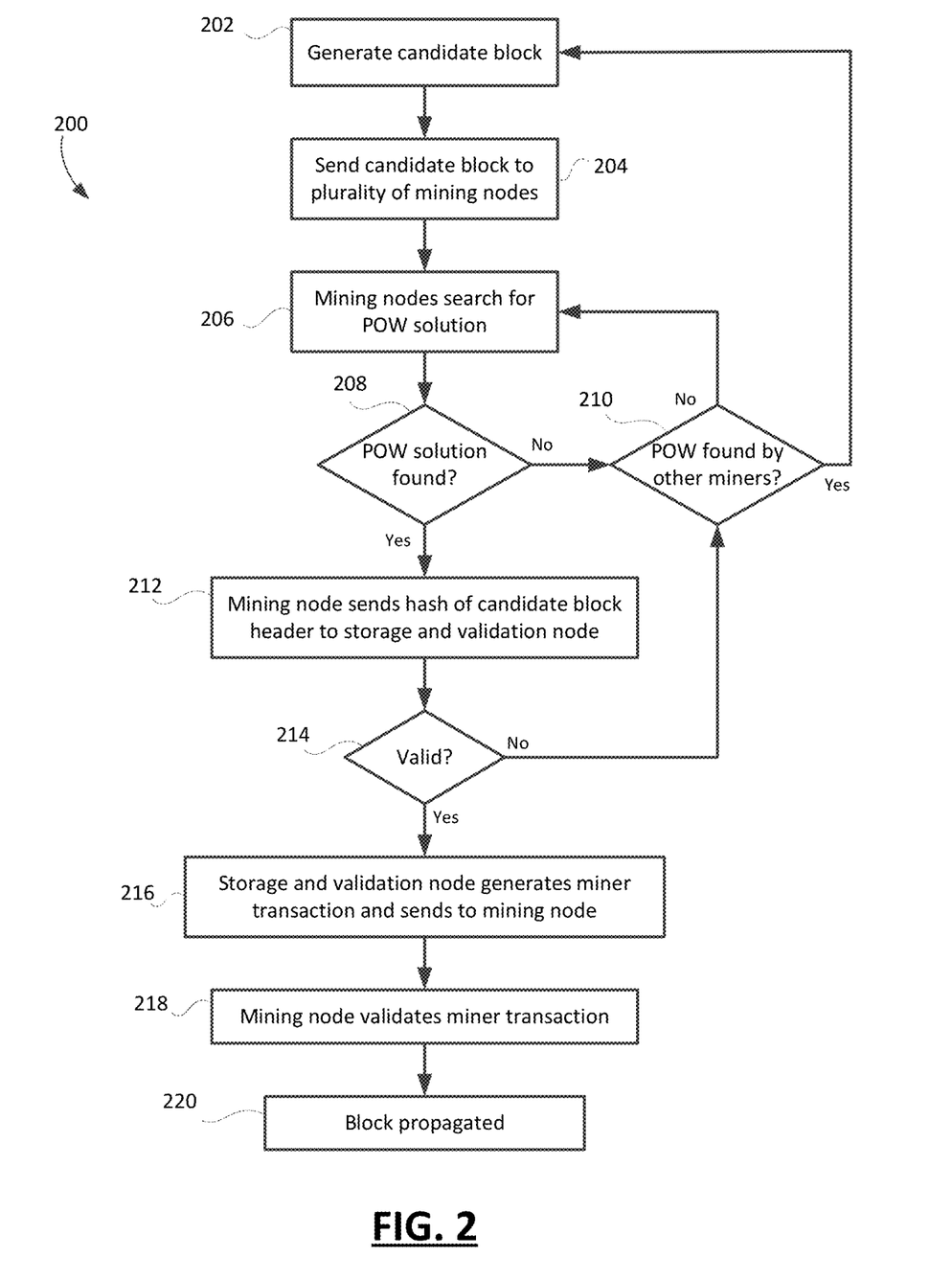
FIG. 2 shows, in flowchart form, one example method of mining on a blockchain networks.

Reference is now made to FIG. 2, which shows a flowchart illustrating an example method 200 of mining on a blockchain network. The method 200 begins with operation 202 in which a storage and validation node (i.e. a non-mining node) builds a candidate block containing transactions from the mempool. The candidate block further includes a generation (coinbase) transaction with an output that allocates new resources to the control of the storage and validation node. In operation 204, the storage and validation node transmits at least the candidate block header to a plurality of miners. The term "mempool" refers to the set of pending transactions in the blockchain network that have not yet been included in a mined block. Any one of a number of nodes in the network, such as full nodes, validation nodes, storage nodes, or other types of nodes, may maintain a copy of the mempool that is constantly updated as new transactions are propagated through the network and as blocks are mined.

The mining nodes search for a POW solution, i.e. a nonce and timestamp, that will result in a double-hashed candidate block header that satisfies the difficultly setting. As indicated by operations 208 and 210, the hashing by the mining nodes continues until they either find a solution or until they are notified that another miner has found and propagated a solution (whether to the same candidate block or to another candidate block).

If one of the mining nodes finds a solution, then in operation 212 the mining node sends a hash of the candidate block header containing the POW solution to the storage and validation node. The storage and validation node assesses in operation 214 whether the purported solution satisfies the difficultly setting by hashing it again to create the double-hash of the candidate block header and assessing whether the result falls below the number set by the difficulty setting. If not, then the search continues.

If the POW solution appears valid, then the storage and validation node generates a miner transaction in operation 216. The miner transaction includes an output locked by a public key associated with the successful miner, and locked so as to require the candidate block header from the hashed candidate block header supplied by the mining node. The miner transaction is sent to the successful mining node. The mining node verifies that the miner transaction is valid in operation 218 and, once validated, the mining node discloses the POW solution in operation 220. This may include sending the candidate block header to the storage and validation node. It may include sending the nonce and timestamp to the storage and validation node. The storage and validation node then propagates the full block on the blockchain network.

The above-described method involves setting up an atomic exchange after one of the mining nodes proves it has found a solution to the POW. Another approach may be used to address the technical problem of bandwidth limitations and to enable the splitting of mining functions from storage and validation functions. In one aspect, an atomic exchange may be established prior to the mining activity. In this aspect, the storage and validation node may construct a candidate block specifically for each mining node. Each candidate block contains a miner transaction having an output unlockable by that mining node, i.e. locked by a public key associated with that mining node. To prevent the mining node from exploiting that miner transaction prior to solving a proof of work, the input to the miner transaction may be a source transaction in the same candidate block, meaning that the miner transaction is only available to be validated if the candidate block is mined. A property of Merkle trees may be exploited to enable the mining node to validate that the candidate block was properly constructed and contains the miner transaction even if the mining node does not have a copy of the full candidate block.

In this aspect, the storage and mining node provides the mining node with the partial candidate block header, including the Merkle root, but does not provide the full block details and specifically does not provide the source transaction. However, to enable the mining node to validate that the candidate block was properly created and contains the miner transaction, the storage and mining node provides the miner node with a copy of the miner transaction and a Merkle proof (which may also be referred to herein as a Merkle path) for the miner transaction. Once a mining node finds a solution, the mining node sends the solution (the nonce and timestamp or, equivalently, the candidate block header containing those values) to the storage and validation node. The storage and validation node verifies that the solution is valid and then propagates the block on the blockchain network. Both the source and miner transactions are then validly on the blockchain and the miner transaction output is available to the mining node.

Although the description below provides details regarding Merkle trees and uses the terms Merkle root and Merkle path, the present application is not necessarily limited to Merkle trees. The term "payload summary" may be used to refer to a value or parameter that effectively is a hash of the contents of a payload, thereby proving the contents of the payload. The Merkle root is an example of a payload summary. The term "summary path" may be used to refer to data that may be used to prove, together with the payload summary, that a particular item of data is included in the payload from which the payload summary was generated. A Merkle path is an example of a summary path.

Prior to providing further details regarding example systems and methods, a brief explanation is provided regarding Merkle trees and proofs.

Merkle Trees and Proofs

Figure 3:
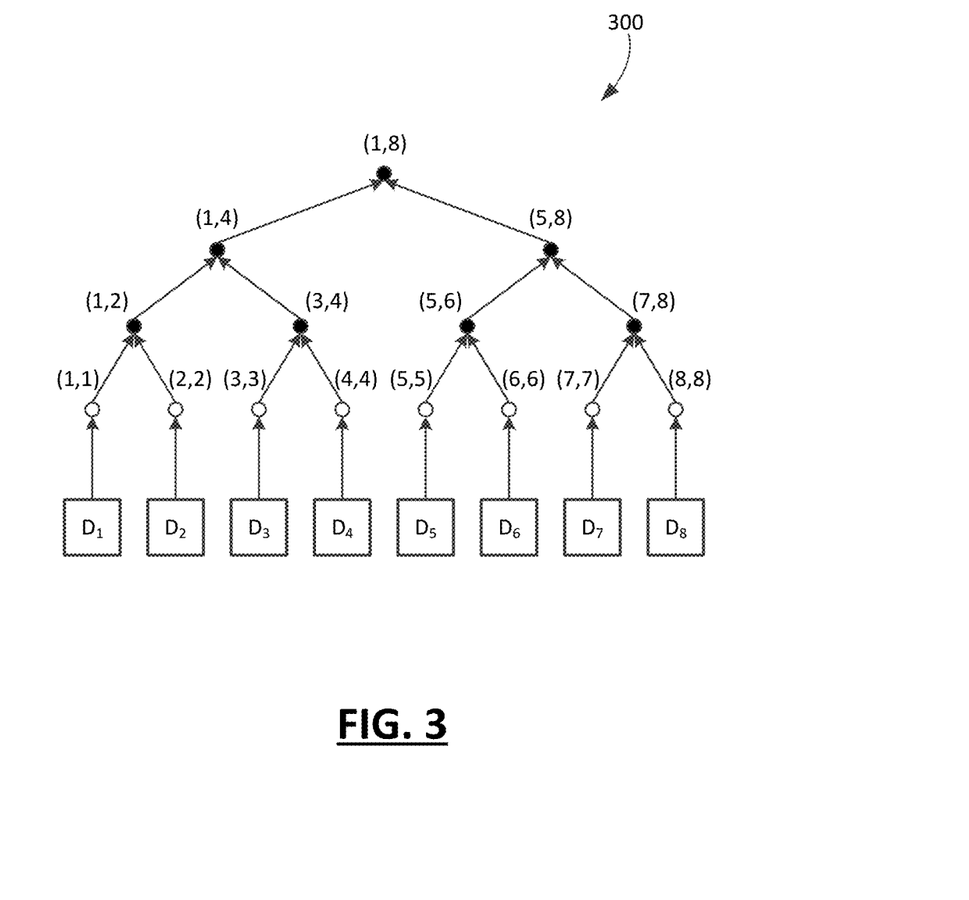
FIG. 3 diagrammatically shows an example Merkle tree.

Reference is made to FIG. 3, which shows an example of a Merkle Tree 300. Each node in the tree has been given an index pair (i,j) and is represented as N(i,j). The indices i,j are simply numerical labels that are related to a specific position in the tree. Each node may be referenced by its index pair (i,j), and each node may have an associated value given by:

$$N(i, j) = \begin{cases} H(D_i) & i = j \\ H(N(i, k) \| N(k+1, j)) & i \neq j \end{cases},$$

where k=(i+j−1)/2 and H is a cryptographic hash function.

It will be noted that the i=j case corresponds to a leaf node, which is simply the hash of the corresponding $i^{th}$ block of data $D_1$. The i≠j case corresponds to an internal or root node, which is generated by recursively hashing and concatenating child nodes in the tree until the specific node or the root is reached.

The construction of Merkle trees requires the use of cryptographic hash functions. In general, a hash function is considered cryptographically secure if it has the following properties:

1. Pre-image resistant—given h=H(m), it is computationally difficult to find m;
2. Second pre-image resistant—given h=H(m) and m, it is computationally difficult to find m' such that H(m')=h; and
3. Collision resistant—it is computationally difficult to find a pair of messages m and m' such that H(m)=H(m').

A transaction identifier TxID is generated using such a hash function, and therefore the identifier inherits the properties of a hash function's digest. It can be shown that a Merkle tree root has very similar properties to a TxID.

The primary function of a Merkle tree in most applications is to facilitate a proof that some data block D is a member of a list or set of N data blocks $D \Sigma\{D_1, \ldots, D_N\}$.

Given a Merkle root and a candidate data block D this can be treated as a 'proof-of-existence' of the block within the set.

The mechanism for such a proof is known as a Merkle proof and consists of obtaining a set of hashes known as the Merkle path for a given data block $D_1$ and Merkle root R. The Merkle path for a data block is the minimum set of hashes required to reconstruct the root R by way of repeated hashing and concatenation, sometimes referred to as the 'authentication path' for a data block.

A proof-of-existence could be performed trivially if all blocks $D_1, \ldots, D_N$ are known to the prover. This does however require a much larger storage overhead than the Merkle path, as well as requiring that the entire data set is available to the prover.

Starting with a Merkle root R it can be proven that the data block $D_1$ belongs to the set $D \Sigma\{D_1, \ldots, D_N\}$ using the following example process:

1. Obtain the Merke root R and the Merkle path F. In this case, F is the set of hashes: $\Gamma=\{N(2,2), N(3,4), N(5,8)\}$
2. Compute a Merkle proof using $D_1$ and $\Gamma$ as follows:
   (a) Hash (or double-hash, depending on implementation) the data block to obtain $N(1,1)=H(D_1)$;
   (b) Concatenate with N(2,2) and hash to obtain N(1,2) =H(N(1,1)∥N(2,2));
   (c) Concatenate with N(3,4) and hash to obtain N(1,4)=H (N(1,2)∥N(3,4));
   (d) Concatenate with N(5,8) and hash to obtain the root: R'=N(1,8)=H(N(1,4)∥N(5,8));
   (e) Compare the calculated root R' with the root R. If R'=R, then the data block $D_1$ is in the tree.

Performing the Merkle proof for a given block $D_1$ and root R is effectively traversing the Merkle tree 'upwards' by using only the minimum number of hash values necessary.

Methods and Devices for Secure Symbiotic Mining

In the examples below, a storage and validation node and a mining node establish an atomic exchange prior to engaging in any mining activity. In these examples, the candidate block that the storage and validation node creates is specific to that mining node. The candidate block contains a miner transaction transferring control over resources to the mining node. However, the input to the miner transaction is a source transaction also within the candidate block and which has not been broadcast on the blockchain network in general. The mining node is not provided with the full candidate block and, in particular, is not provided with the full source transaction. This prevents the mining node from having the miner transaction carried out unless the candidate block itself is mined, i.e. unless the miner succeeds in finding a POW for the candidate block.

Prior to engaging in mining, the mining node receives the partial candidate block header from the storage and validation node, which includes the Merkle root. It also receives at least a copy of the miner transaction and the Merkle path for the miner transaction. From this received data, the mining node validates that the miner transaction is included in the candidate block by performing a Merkle proof.

Figure 4:
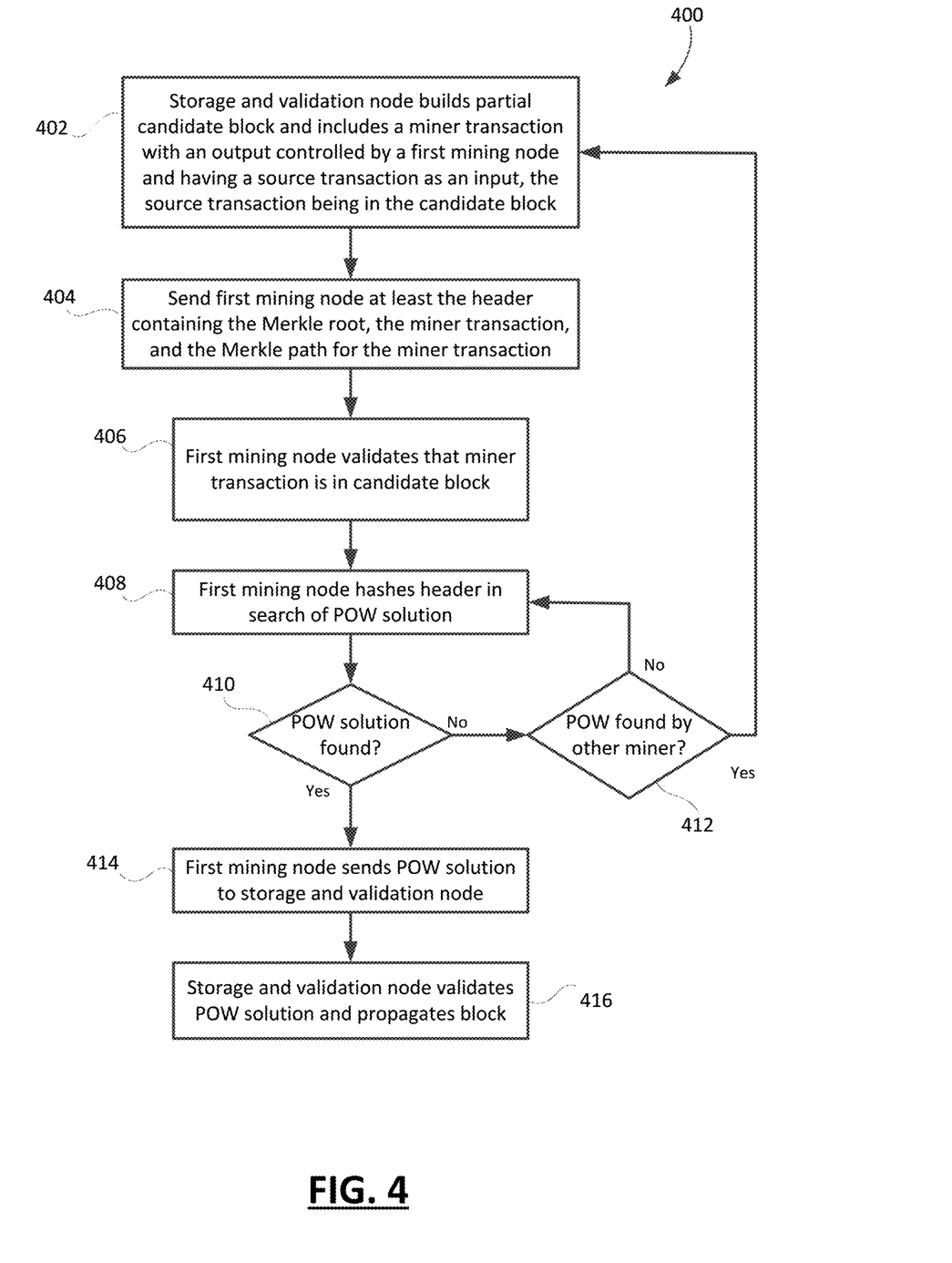
FIG. 4 shows another simplified example of a partial blockchain network with split mining and storage/validation nodes.

Reference is now made to FIG. 4, which shows, in flowchart form, an example method 400 of mining in a blockchain network using separated mining and validation nodes. Some of the operations shown in FIG. 4 are carried out by a storage and validation node and some of the operations are carried out by a mining node. The storage and validation node has network connectivity to at least one mining node.

In operation 402, the storage and validation node builds a partial candidate block for one of the mining nodes. It may build a plurality of candidate blocks each for a distinct mining node in some cases. In some implementations, the candidate blocks contain identical transactions, but for the miner transaction which is unique to each miner. As a part of building the candidate block, the storage and validation node calculates the Merkle root for the block and records the Merkle root value in the partially-complete candidate block header. The candidate block header is only a partial candidate block header in that it contains the version, previous block hash, Merkle root, and nBits value, but does not yet contain the timestamp and nonce.

The notation $\mathbb{B}$ may be used for a complete, valid block and the notation $\mathbb{B}*$ for partial candidate block which is incomplete, lacking a valid proof of work solution in the form of a timestamp $T_x$ and nonce X. Similarly, the notation $\phi$ may be used to signify a block header, and the notation $\phi*$ for a partial candidate block header.

The candidate block header contains a generation (coinbase) transaction having an output associated with the storage and validation node's public key. In other words, the generation transaction allocates resources (e.g. a block reward) to the storage and validation node. It will be appreciated that some blockchain protocols prescribe that resources allocated by way of a generation transaction cannot be transferred for a certain period of time after generation, typically measured in block height. This may be referred to as "coinbase maturity" in some cases.

The miner transaction in the candidate block includes an output locked using a public key for the mining node associated with that miner transaction and that candidate block. The input to the miner transaction is the output of a source transaction contained in the candidate block. The source transaction output is controlled by the storage and validation node, which digitally signs the input to the miner transaction. Notably, the source transaction is not included in the mempool for the blockchain network and is not otherwise publicly available. It is only broadcast in the event that one of the storage and validation node's candidate blocks is successfully mined. This prevents the input from any of the miner transactions from being valid unless and until one of the storage and validation node's candidate blocks is mined and thus prevents a mining node from simply broadcasting its miner transaction on the blockchain network in hopes that it will be validated without the mining node succeeding in mining its candidate block.

The mining node has the mining transaction available to it because in operation 404 the storage and validation node sends the mining node the partial candidate block header, a copy of the miner transaction from that candidate block, and the Merkle path for the miner transaction.

The mining node, in operation 406, validates that the miner transaction is included in the candidate block associated with the candidate block header received. It does so by determining a Merkle proof using the miner transaction and its Merkle path, both received from the storage and validation node. The Merkle proof should result in a value that matches the Merkle root contained in the partial candidate block header. If so, and if the miner transaction has an output associated with the mining node's public key, then the mining node has validated that the provided partial candidate block header is legitimately constructed.

In some implementations, the storage and validation node may also provide the mining node with a hash of the source transaction and a Merkle path for the source transaction: $H(T_{source})$, $\Gamma(R,T_{Source})$ Notably, it does not provide the actual source transaction so that it does not compromise security; however, the mining node may still verify that the input to the miner transaction is present in the candidate block by determining a Merkle proof for the source transaction. Recall that the TXID of a transaction is given by a hash of that transaction. Therefore, although the mining node does not have the actual source transaction, it has a hash of that transaction and can therefore verify that the source transaction is properly referenced at the input to the miner transaction and that it is present in the candidate block.

Accordingly, even if the storage and validation node provides the mining node with a hash of the source transaction and its Merkle path, the quantity of data that it sends to the mining node is very small compared to sending the entire candidate block. The data sent may be expressed using the tuple:

$$V=(R,T_{Miner},H(T_{source}),\Gamma(R,T_{miner}),\Gamma(R,T_{source}))$$

In operation 408, having validated the received data, the mining node then engages in the search for a POW for the candidate block, i.e. it inserts a nonce and timestamp into the partial candidate block header and hashes it in accordance with the governing blockchain protocol to attempt to find a value less that the difficultly threshold. The hashing of the candidate block header, with iterated nonce values and timestamps, continues until another entity finds a block or until the mining node succeeds, as indicated by operations 410 and 412.

If the mining node succeeds in finding a POW, then in operation 414 it sends the solution, e.g. the nonce and timestamp, or, equivalently, the complete block header, to the storage and validation node. The storage and validation node 416 quickly verifies that the solution is legitimate and then broadcasts the new block on the blockchain network.

As a result of finding a new block, the storage and validation node's generation transaction is incorporated which allocates the block reward to the storage and validation node. The source transaction and miner transaction are also incorporated, which both provides the resources to satisfy the input to the miner transaction and transfers control over the resources to the mining node by virtue of the output to the miner transaction being locked using the mining node's public key.

It may be appreciated that the entire interaction between the storage and validation node and the mining node is an atomic exchange. There is a two-way information asymmetry established between the two nodes. The asymmetry is resolved atomically when the proof of work is found and provided to the storage and validation node. This two-way information asymmetry is really achieved by the careful construction of the Merkle tree, whose root R exists in the incomplete block header $\phi*$.

The above-described example process enables the division of mining and storage/validation functions. Enabling the division in this manner allows for the location of mining nodes in areas with low bandwidth connectivity. It also enables the division of ownership and control, meaning that storage and validation nodes may operate independently from mining nodes, with no need for third party trust because the information asymmetry is structured to ensure neither node may exploit or defraud the other.

Figure 5:
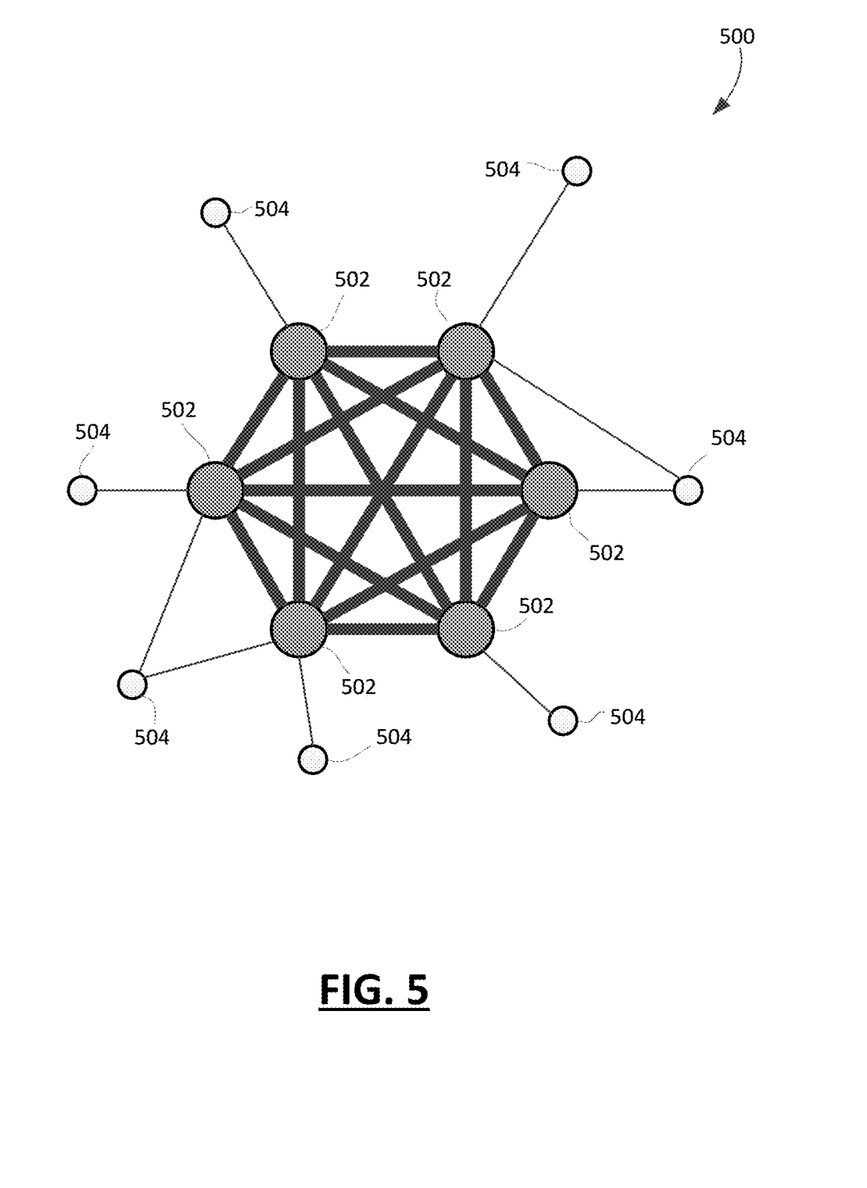
FIG. 5 shows, in flowchart form, another example method of mining on a blockchain network.

Reference is now made to FIG. 5, which diagrammatically illustrates a simplified example blockchain network 500. The network 500 in this simplified example includes storage and validation nodes 502 and mining nodes 504. It will be appreciated that the storage and validation nodes 502 are interconnected by high-bandwidth fast network connections. The storage and validation nodes 502 in this example are sufficiently well connected to realize a small-world network. The mining nodes 504 are each connected to at least one storage and validation node 502. The connections between the mining nodes 504 and the storage and validation nodes 502 are not necessarily high-bandwidth connections since the quantity of data communication over these connections is relatively small.

In some cases, one or more mining nodes 504 may be connected to at least two storage and validation nodes 502. This may enable a mining node 504 to offer its hashpower for mining on behalf of one of the storage and validation nodes 502, thereby enabling the mining node 504 to evaluate competing offers from the storage and validation nodes 502 in terms of the miner transactions includes in their respective candidate blocks. Likewise, the storage and validation nodes 502 may be connected to a plurality of mining noes 504 so as to solicit participation in mining from a number of possible mining nodes 504. This may effectively create a marketplace competition that is reflected in miner transactions offered by the storage and validation nodes 502.

Because of the lack of a need for high bandwidth connections between the mining nodes 504 and the storage and validation nodes 502, the storage and validation nodes 502 may be located wherever resources are best available for fulfilling its functions, such as high-bandwidth low-latency connections to other storage and validation nodes 502. The mining nodes 504 may be located wherever resources are available that best fit their needs, such as abundant low-cost electricity for running large mining rigs, without the necessity of being co-located with the storage and validation nodes 502.

Figure 6:
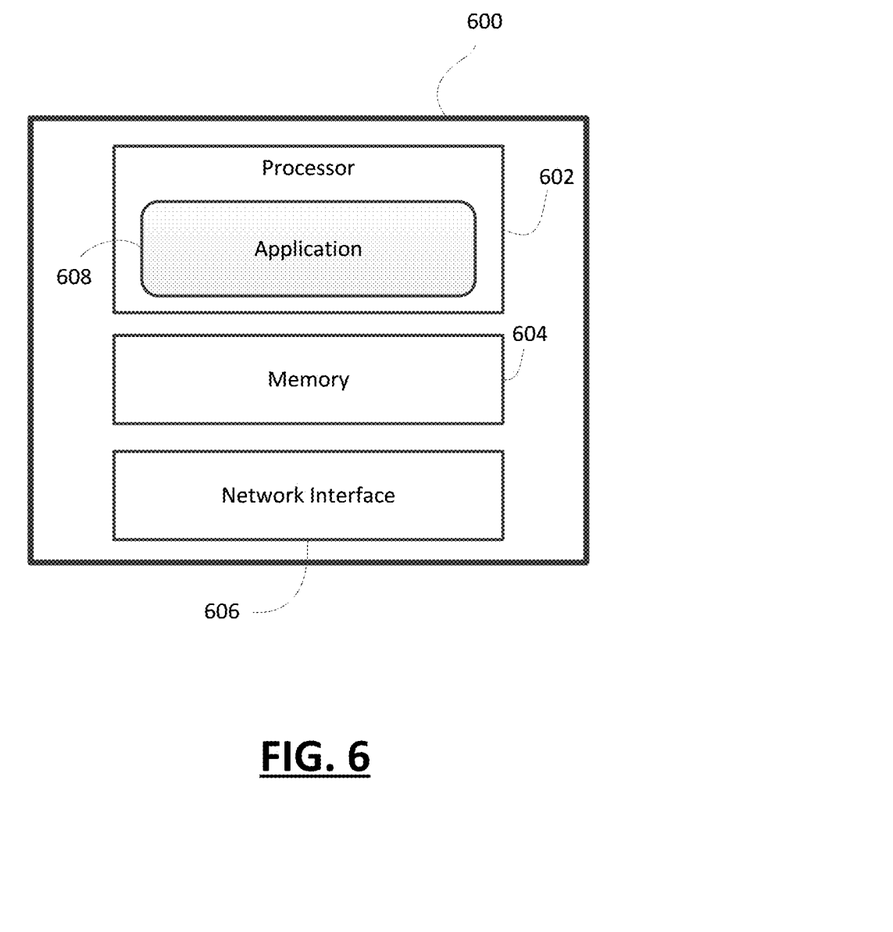
FIG. 6 shows, in block diagram form, a simplified example of a computing node in a blockchain network.

Reference is now made to FIG. 6, which shows, in block diagram form, a simplified computing device 600, in accordance with an example of the present application. The computing device 600 may carry out one or more of the above-described functions. In some examples, the computing device 600 may be a mining node. In some examples, the computing device 600 may be a storage and validation node.

The computing device 600 includes a processor 602, which may include one or more microprocessors, application specific integrated circuits (ASICs), microcontrollers, or similar computer processing devices. The computing device 600 may further include memory 604, which may include persistent and non-persistent memory, to store values, variables, and in some instances processor-executable program instructions, and a network interface 606.

The computing device 600 may include a processor-executable application 608 containing processor-executable instructions that, when executed, cause the processor 602 to carry out one or more of the functions or operations described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of mining in a blockchain network, the blockchain network including a non-mining node and a plurality of mining nodes, the method comprising:
   generating, by the non-mining node, a candidate block containing a plurality of transactions including a source transaction that includes a first output associated with the non-mining node and a miner transaction that includes the first output of the source transaction as an input and includes a second output associated with a first mining node;
   determining a payload summary of the candidate block;
   sending, to the first mining node, the payload summary, the miner transaction, and a first summary path for the miner transaction;
   receiving, from the first mining node, a proof-of-work solution for the candidate block; and
   propagating the candidate block on the blockchain network,
   wherein the source transaction and the mining transaction are not propagated on the blockchain network and are not contained in a mempool prior to receipt of the proof-of-work solution for the candidate block.

2. The method claimed in claim 1, wherein sending excludes sending the source transaction to the first mining node.

3. The method claimed in claim 1, wherein sending includes sending a candidate block header for the candidate block, the candidate block header containing the payload summary.

4. The method claimed in claim 1, wherein sending includes sending, to the first mining node, a hash of the source transaction and a second summary path for the source transaction.

5. The method claimed in claim 1, wherein the plurality of transactions in the candidate block further includes a generation transaction that includes a coinbase output associated with the non-mining node.

6. The method claimed in claim 1, further including, at the first mining node, validating that the miner transaction is included in the candidate block based on the payload summary and the first summary path.

7. The method claimed in claim 6, wherein sending includes sending, to the first mining node, a hash of the source transaction and a second summary path for the source transaction, and wherein validating includes validating that the source transaction is included in the candidate block based on the payload and the second summary path.

8. The method claimed in claim 1, wherein the payload summary includes a Merkle root, the first summary path includes a first Merkle path, and the first Merkle path includes a minimum set of hashes for reconstructing the Merkle root from the miner transaction.

9. The method claimed in claim 1, further comprising:
   generating, by the non-mining node, a second candidate block containing a second plurality of transactions including the source transaction and a second miner transaction that includes the first output of the source transaction as an input and includes a further output associated with a second mining node different from the first mining node.

10. A computer-implemented method of mining in a blockchain network, the blockchain network including a non-mining node and a mining node, the method comprising:
- receiving, at the mining node from the non-mining node, a candidate block header for a candidate block, a payload summary for the candidate block, a miner transaction, and a first summary path for the miner transaction;
- validating that the miner transaction is included in the candidate block based on the payload summary and the first summary path;
- repeatedly mining the candidate block header with successive nonce values inserted in the candidate block header until a proof-of-work is found; and
- sending, to the non-mining node, at least the nonce value corresponding to the proof-of-work.

11. The computer-implemented method of claim 10, wherein receiving further includes receiving a hash of a source transaction and a second summary path for the source transaction, and the method further comprises validating that the source transaction is included in the candidate block based on the hash of the source transaction and the second summary path.

12. The computer-implemented method of claim 10, wherein the payload summary includes a Merkle root, the first summary path includes a first Merkle path, and the first Merkle path includes a minimum set of hashes for reconstructing the Merkle root from the miner transaction.

13. A computing device to implement a storage and validation node within a blockchain network, the blockchain network including a plurality of mining nodes, the computing device including:
- one or more processors;
- memory storing blockchain data; and
- computer-executable instructions stored in the memory that, when executed by the one or more processors, cause the one or more processors to:
  - generate a candidate block containing a plurality of transactions including a source transaction that includes a first output associated with the storage and validation node and a miner transaction that includes the first output of the source transaction as an input and includes a second output associated with a first mining node;
  - determine a payload summary of the candidate block;
  - send, to the first mining node, the payload summary, the miner transaction, and a first summary path for the miner transaction;
  - receive, from the first mining node, a proof-of-work solution for the candidate block; and
  - propagate the candidate block on the blockchain network,
  - wherein the source transaction and the mining transaction are not propagated on the blockchain network and are not contained in a mempool prior to receipt of the proof-of-work solution for the candidate block.

14. A non-transitory computer-readable medium storing processor-executable instructions for implementing a storage and validation node within a blockchain network, the blockchain network including a plurality of mining nodes, the processor-executable instructions including instructions that, when executed by one or more processors, cause the one or more processors to:
- generate a candidate block containing a plurality of transactions including a source transaction that includes a first output associated with the storage and validation node and a miner transaction that includes the first output of the source transaction as an input and includes a second output associated with a first mining node;
- determine a payload summary of the candidate block;
- send, to the first mining node, the payload summary, the miner transaction, and a first summary path for the miner transaction;
- receive, from the first mining node, a proof-of-work solution for the candidate block; and
- propagate the candidate block on the blockchain network,
- wherein the source transaction and the mining transaction are not propagated on the blockchain network and are not contained in a mempool prior to receipt of the proof-of-work solution for the candidate block.

15. The computing device of claim 13, wherein the instructions, when executed, are to cause the one or more processors to send the payload summary while excluding sending the source transaction to the first mining node.

16. The computing device of claim 13, wherein the instructions, when executed, are to cause the one or more processors to send by sending a candidate block header for the candidate block, the candidate block header containing the payload summary.

17. The computing device of claim 13, wherein the instructions, when executed, are to cause the one or more processors to validate that the miner transaction is included in the candidate block based on the payload summary and the first summary path.

18. The computing device of claim 17, wherein the instructions, when executed, are to cause the one or more processors to send by sending, to the first mining node, a hash of the source transaction and a second summary path for the source transaction, and to validate by validating that the source transaction is included in the candidate block based on the payload and the second summary path.

19. The computing device of claim 13, wherein the instructions, when executed, are to cause the one or more processors to generate, by a non-mining node of the blockchain network, a second candidate block containing a second plurality of transactions including the source transaction and a second miner transaction that includes the first output of the source transaction as an input and includes a further output associated with a second mining node different from the first mining node.

* * * * *